United States Patent
Adkins et al.

[11] Patent Number: 5,630,957
[45] Date of Patent: May 20, 1997

[54] CONTROL OF POWER TO AN INDUCTIVELY HEATED PART

[76] Inventors: Douglas R. Adkins, 1620 Adelita Dr. NE., Albuquerque, N.M. 87112; Charles A. Frost, 1039 Red Oaks Loop NE., Albuquerque, N.M. 87122; Philip M. Kahle, 528 Longwood Loop NE., Rio Rancho, N.M. 87124; J. Bruce Kelley, 13200 Blue Corn Maiden Trail NE.; Suzanne L. Stanton, 2805 Palo Alto NE., both of Albuquerque, N.M. 87112

[21] Appl. No.: 371,901

[22] Filed: Jan. 12, 1995

[51] Int. Cl.[6] ........................ H05B 6/08
[52] U.S. Cl. ............ 219/665; 219/663; 219/635; 148/567; 266/90; 266/129
[58] Field of Search .................... 219/635, 663, 219/665, 666, 667, 602; 148/567, 570, 571, 572, 573; 266/129, 90

[56] References Cited

U.S. PATENT DOCUMENTS

| | | | |
|---|---|---|---|
| 3,743,808 | 7/1973 | Kasper | 219/665 |
| 4,307,276 | 12/1981 | Kurata | 219/667 |
| 4,327,268 | 4/1982 | Frank | 219/665 |
| 4,618,125 | 10/1986 | Balzer | 266/90 |
| 4,675,057 | 6/1987 | Pfaffmann et al. | 148/129 |
| 4,701,584 | 10/1987 | Rylicki | 219/639 |
| 4,728,761 | 3/1988 | Mucha et al. | 219/10.43 |
| 4,798,925 | 1/1989 | Ishizaka | 219/665 |
| 4,816,633 | 3/1989 | Mucha et al. | 219/10.41 |
| 4,897,518 | 1/1990 | Mucha et al. | 219/10.41 |
| 5,250,776 | 10/1993 | Pfaffmann | 219/10.77 |

FOREIGN PATENT DOCUMENTS

| | | | |
|---|---|---|---|
| 52-69036 | 6/1977 | Japan | 219/666 |

OTHER PUBLICATIONS

Verhoeven, H. L. et al, *Induction Case Hardening of Steel*, J. Heat Treating, Am. Soc. for Metals, vol. 4, No. 3, pp. 253–264, Jun. 1986.

Zinn, S. and Semiatin, S. L., *Elements of Induction Heating, Design, Control, and Applications*, Carnes Publication Services, Inc., pp. 158–162 and pp. 178–183, 1988.

Hassell, P. A., *Potential of Monitoring Induction Heating in Real Time*, Industrial Heating, pp. 42–45, Jan., 1994.

*Primary Examiner*—Philip H. Leung
*Attorney, Agent, or Firm*—George H. Libman

[57] ABSTRACT

A process for induction hardening a part to a desired depth with an AC signal applied to the part from a closely coupled induction coil includes measuring the voltage of the AC signal at the coil and the current passing through the coil; and controlling the depth of hardening of the part from the measured voltage and current. The control system determines parameters of the part that are functions of applied voltage and current to the induction coil, and uses a neural network to control the application of the AC signal based on the detected functions for each part.

9 Claims, 6 Drawing Sheets

CONTROL OF POWER TO AN INDUCTIVELY HEATED PART

The U.S. Government has rights in this invention pursuant to Department of Energy Contracts No. DE-AC04-76DP00789 and DE-AC04-94AL85000 with the American Telephone and Telegraph Company and Sandia Corporation, respectively.

BACKGROUND OF THE INVENTION

Many applications require a steel part having a hardened outer surface and an interior region of lower hardness to provide improved strength, wear resistance, and toughness. Induction case hardening is a commonly used industry process to produce parts with hard outer cases and unhardened interior regions. During this process, eddy currents are induced into the surface layer of a steel part by passing alternating current through a closely coupled induction coil. The induced current heats the part from its surface to form an austenitic layer extending into the part from the surface, with the depth of the layer being a function of the frequency, power, and duration of the applied signal. Final hardening of the outer layer occurs when the power is shut off and the part is quenched from the outside to form a hardened martensitic structure.

Induction hardened parts often are designed to have a hardened layer within a desired depth. For example, a 25 mm diameter axle may be designed with a hardened layer from 4 to 5 mm thick. Should the layer be too thin, the axle would wear too quickly or have insufficient strength; should the layer be too thick, the axle would be too brittle.

Control of the hardening process has been an elusive goal of the industry for many years. Existing induction hardening equipment is typically operated with open-loop process controllers wherein an operator manually selects power and time. Production users of this equipment monitor the process by destructively sectioning parts and inspecting the results; i.e., a finished part is cut apart and the case depth is measured on the cross section. Process development for new parts is accomplished by time-consuming and expensive trial-and-error; for a given coil and part design, heating and quenching parameters are varied until destructive analysis reveals that the desired hardness distribution is being produced. These parameters are then utilized in the production run and the hardened parts are sampled and analyzed at regular intervals. If the tested part is bad, the production run from the previously tested good part is sampled to determined where the process failed. In addition, the production equipment may be taken out of service until subsequent parts test satisfactory. Since each test can take a minimum of several minutes by a trained technician, this process is quite inefficient in production operation.

An active feedback of information from the part and control of the heating process would greatly improve the efficiency of induction hardening systems. J. D. Verhoeven et al., *Induction Case Hardening of Steel*, Heat Treating, Vol. 4, No. 3, June 1986, pp. 253–262, used a transformerless system and measured the current and voltage at the heating coil, and the temperature of the part. They determined that case depth is proportional to the integral of the power density of the part over the heating time, and that power density is proportional to the square of the applied current. They postulated that a microprocessor could be used to terminate the system power at a predetermined time based on applied current.

U.S. Pat. No. 4,816,633 of George Mucha et al. discloses a method of monitoring an induction heating cycle by digitizing an analog signal representative of the applied voltage and comparing the resulting signal with a range of preselected patterns. A pattern outside the preselected pattern range indicates a problem with the process.

Peter Hassell, *Potential of Monitoring Induction Heating in Real Time*, Industrial Heating, January 1984, pp. 42–45, also discusses the desirability of determining comparative signatures of voltages and currents for the induction heating process, storing these signatures in a computer, and the potential of using the signatures to control the heating process. However, this reference does not discuss a specific method for monitoring signals or controlling the process in real time.

Until the present invention, there have been two significant limitations on the implementation of feedback control as proposed by Hassell and Verhoeven: it is very difficult to determine the power at the part, as the production machine includes a transformer, and the heating coil surrounds the part; and once the austentic phase begins, the increase in layer thickness occurs very quickly, so the system must respond very quickly. There is no showing in the prior art of a methodology by which the induction hardening process can be controlled in real time. Characteristic signals were known to exist, but there had been no showing of what they meant, how to track them in real time, or how to control the process based on them.

SUMMARY OF THE INVENTION

It is an object of this invention to provide a system that produces useful characteristic process signals that are representative of changes in the electrical properties of a part as a function of heating the outer surface of the part.

It is another object of this invention to use the process signals to monitor the depth of heating of the part.

It is a further object of this invention to provide a control system using a neural network to analyze the heating of a part in real time as a function of measured electrical properties, and to control the depth of heating of the part.

It is still another object of this invention to use the process signals and neural network output to diagnose faults which occur during the heating of a part, thus allowing the operating condition of the machine to be monitored in real time.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise a process for induction hardening a part to a desired depth with an AC signal applied to the part from a closely coupled induction coil by measuring the voltage of the AC signal at the coil and the current passing through the coil; and controlling the depth of hardening of the part from the measured voltage and current. The invention further may comprise a system for induction hardening a part to a desired depth using an induction coil for closely coupling AC to a part; an AC power supply having an AC output connected to the induction coil; a voltage measuring devices for measuring the voltage of the AC output at the coil; a current measuring device for measuring the current passing through the coil; and a control device, connected to the voltage and current measuring devices, for determining the depth of hardening of the part from the measured voltage and current.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

Figure 1:
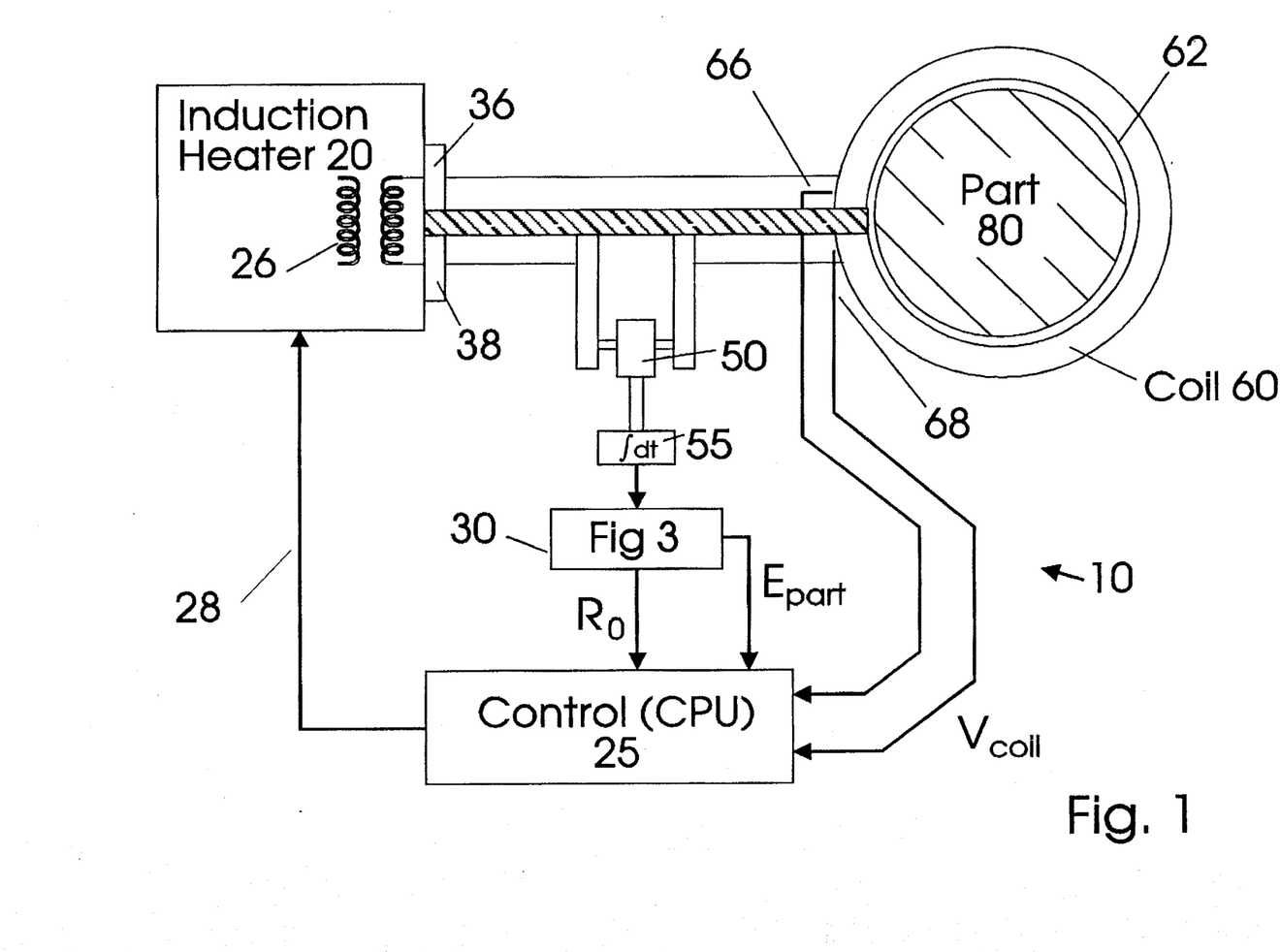
FIG. 1 shows a schematic diagram of a first embodiment of this invention.

As shown in FIG. 1, in accordance with a first embodiment of the present invention, an induction hardening control system 10 includes an induction hardening machine 20 such as an Inductoheat UPF9-100-10, a series-tuned machine rated at 100 kW, 10 kHz output. Power is delivered by machine 20 to part 80 from an induction coil 60 by rectifying the AC input to machine 20 to produce DC, and then creating a complex AC output signal which is fed through output transformer 26 to coil 60. Although the delivered power is a function of voltage, current, frequency, phase angle, and time, the only controls for a user to set on this conventional machine are a power potentiometer, which affects all aspects of the electrical signal, and a timer.

Machine 20 may have a feedback control loop to regulate the voltage, current, or power supplied by the machine to the part, as selected by an internal jumper. This control loop is not influenced by the depth of heating of the part and provides no opportunity to control the depth of heating in a real-time, closed loop, mode. A major goal of this invention was to monitor signals at coil 60 or part 80, and include this data in a control loop that represented the depth of heating of the part.

The initial experimentation for this invention utilized three versions of part 80. The longer specimen, a cylinder with a diameter of 23.4 mm (0.9375") and a length of 100 mm (4"). represented a typical production part such as an automobile axle. The shorter specimen had the same diameter and a length of 25 mm (1") and provided data to benchmark computational models. The third specimen was an internally cooled hollow cylinder that permitted an accurate measurement of power transferred to the part, which measurement was important in the verification of the theory of the invention. The cylinders were made of 1050 steel provided by two manufacturers. System 10 reacts to differences in part materials in controlling the depth of hardening, as subtle differences in steel properties cause a noticeable difference in the depth of hardening for identical electrical input as measured at the primary side of transformer 26. Prior art machines that utilized measurements at the transformer primary for feedback do not quantify such differences for control purposes.

Induction coil 60 typically includes a pair of input legs 66, 68 separated by a small gap and electrically connected to each other by the coil structure which has an inner diameter 62 that is typically about 1.5 mm (0.060") larger than the outer diameter of part 80. Coil legs 66, 68 are respectively connected to secondary terminals 36, 38 of output transformer 26. Coil 60 had a length of about 25 mm (1") and was constructed of copper. As is conventional with such coils, cooling water is circulated through hollow passages in coil 60.

In operation, part 80 is mounted within coil 60 on a rotatable spindle (not shown). Part 80 is rotated at a sufficient speed (typically 150–300 rpm) to provide a uniform heating profile of the part, and power is applied by machine 20 to coil 60. After application of sufficient power to heat part 80 above its austenization temperature to a specified depth, power to coil 60 is removed and part 80 is quickly quenched in a spray of liquid quenchant provided by machine 20.

Figure 2A:
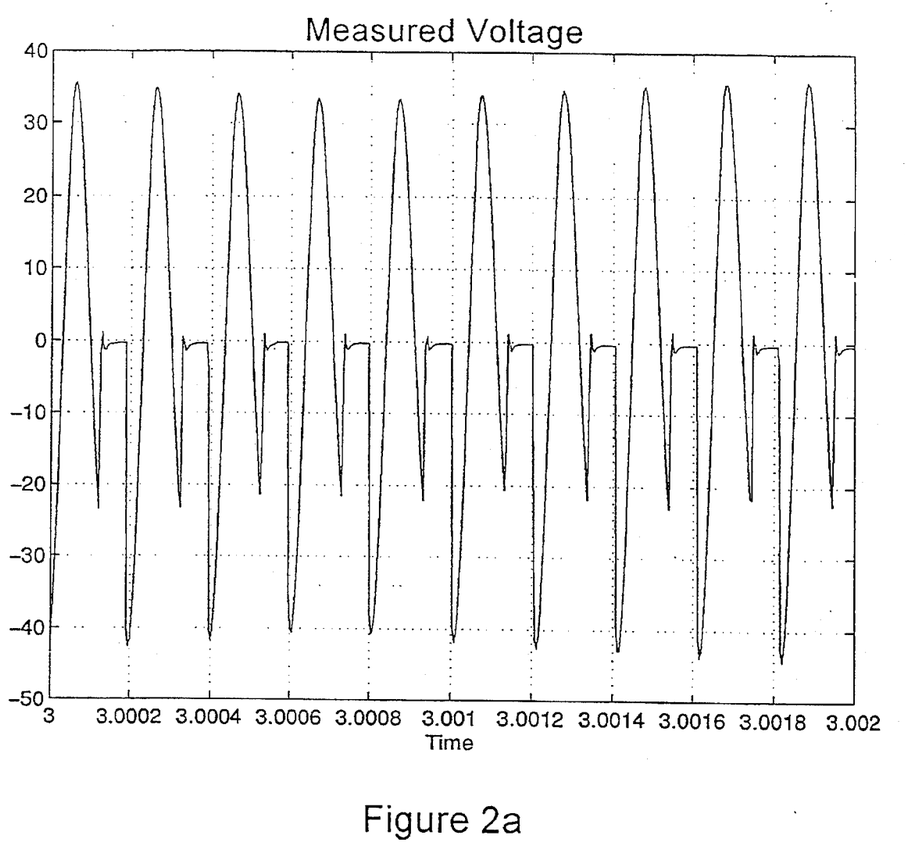
FIGS. 2a and 2b show voltage and current waveforms of the invention.
Figure 2B:
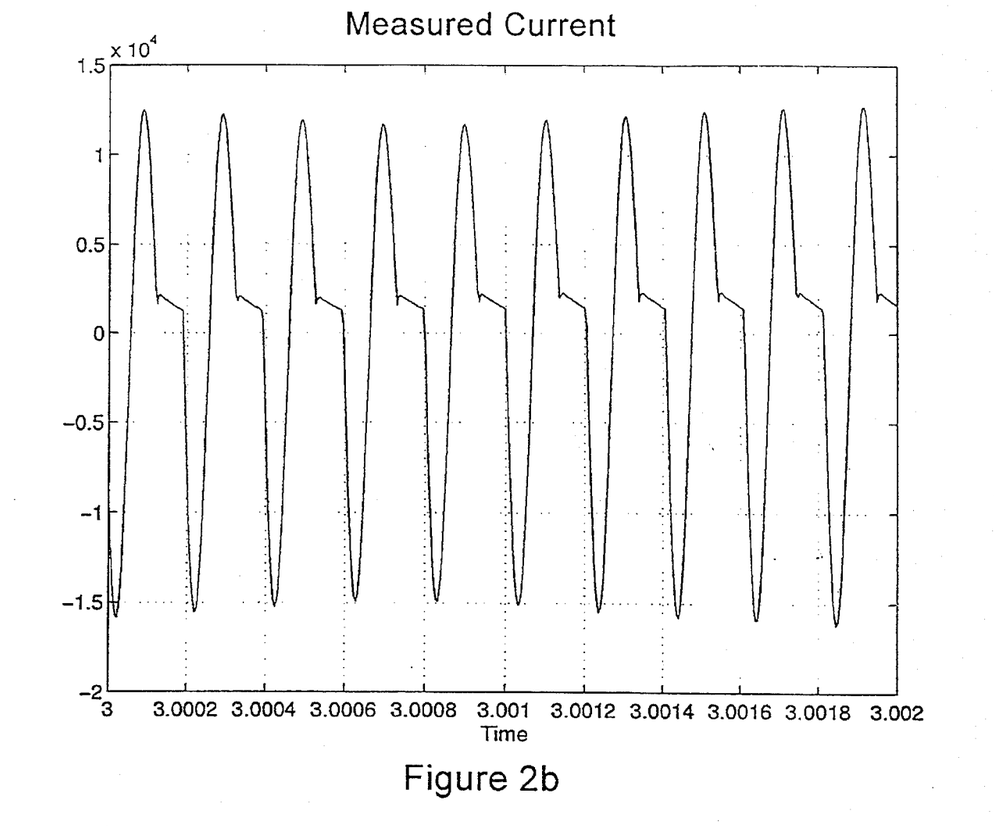

FIG. 2a shows a typical voltage waveform and FIG. 2b shows a typical current waveform for coil 60 while heating a part 80. The voltage waveform is provided by a straightforward measurement across legs 66 and 68 of coil 60. Current is measured by a 22 turn Rogowski coil 50 shielded to minimize noise from local magnetic fields. A Rogowski coil is a known device used for measuring the rate of change of currents in pulse power applications. Analog integrator 55 converts the output of Rogowski coil 50 into a current signal.

Both the voltage signal from coil 60 and the current signal from integrator 55 are processed by processor 30, as discussed hereinafter, to yield outputs representative of the changing electrical properties of part 80. These parameters representative of the AC signal are compared with desired parameter patterns by computer 25 which generates a control signal 28 that feeds back to machine 20 to control the heating of part 80.

The parameters of part 80 that are preferably used to control the system are time integrals of the measured signals, as the use of such integrals greatly enhances the efficiency of signal processing. In the preferred embodiment of FIG. 1, these signals are the combined resistance $R_O$ of coil 60 and part 80, and the energy $E_{part}$ that is applied to part 80. Each of these values is computed from the measured voltage V and current I at coil 60.

The total power P in both part 80 and coil 60 is:

$$P(t) = V(t)I(t) \qquad \text{(eq. 1)}$$

and the total energy E in part 80 and coil 60 is:

$$E(t) = \int_0^t P(t)dt \qquad \text{(eq. 2)}$$

The energy to part 80 is the total energy less the energy into coil 60, which may be computed from coil resistance $R_c$, which is determined from the coil voltage and current when no part is in coil 60 as follows:

$$R_c = \int_t^{t+\Delta t} V_{np}I_{np}dt / \int_t^{t+\Delta t} I_{np}^2 dt \qquad \text{(eq. 3)}$$

and $$E_{part} = \int_0^t [P(t) - R_c * I^2]dt \qquad \text{(eq. 4)}$$

Power to the part is the time averaged slope of the energy to the part:

$$P_{part}(t) = \frac{E_{part}(t+\Delta t) - E_{part}(t)}{\Delta t} \qquad \text{(eq. 5)}$$

For these calculations, the time increment $\Delta t$ is selected to average the signal over several cycles, because the heating (several milliseconds) is in a slower time scale than the period of the frequency of the signal (several kilohertz).

Tests with the water-cooled part demonstrated that equation 5 provides an accurate calculation of the power that is delivered to a part.

The total resistance of the coil and part during heating of the part is defined as $$R_0(t) = E(t)/\int_0^t I^2 dt \qquad \text{(eq. 6)}$$

and indicates when the properties of the material have changed, an indication that heat is traveling inwardly from the surface of the part. It also provides information on the condition of the part and process.

As shown in FIG. 1, the values of $E_{part}$ and $R_0$ are provided by signal processor 30, which may be implemented in software as part of computer 25, or by discrete hardware. Since real-time implementation of this portion of the system in software would require massive computing capabilities, the preferred embodiment of this invention utilizes the instantaneous response of analog signal processing hardware 30.

Figure 3:
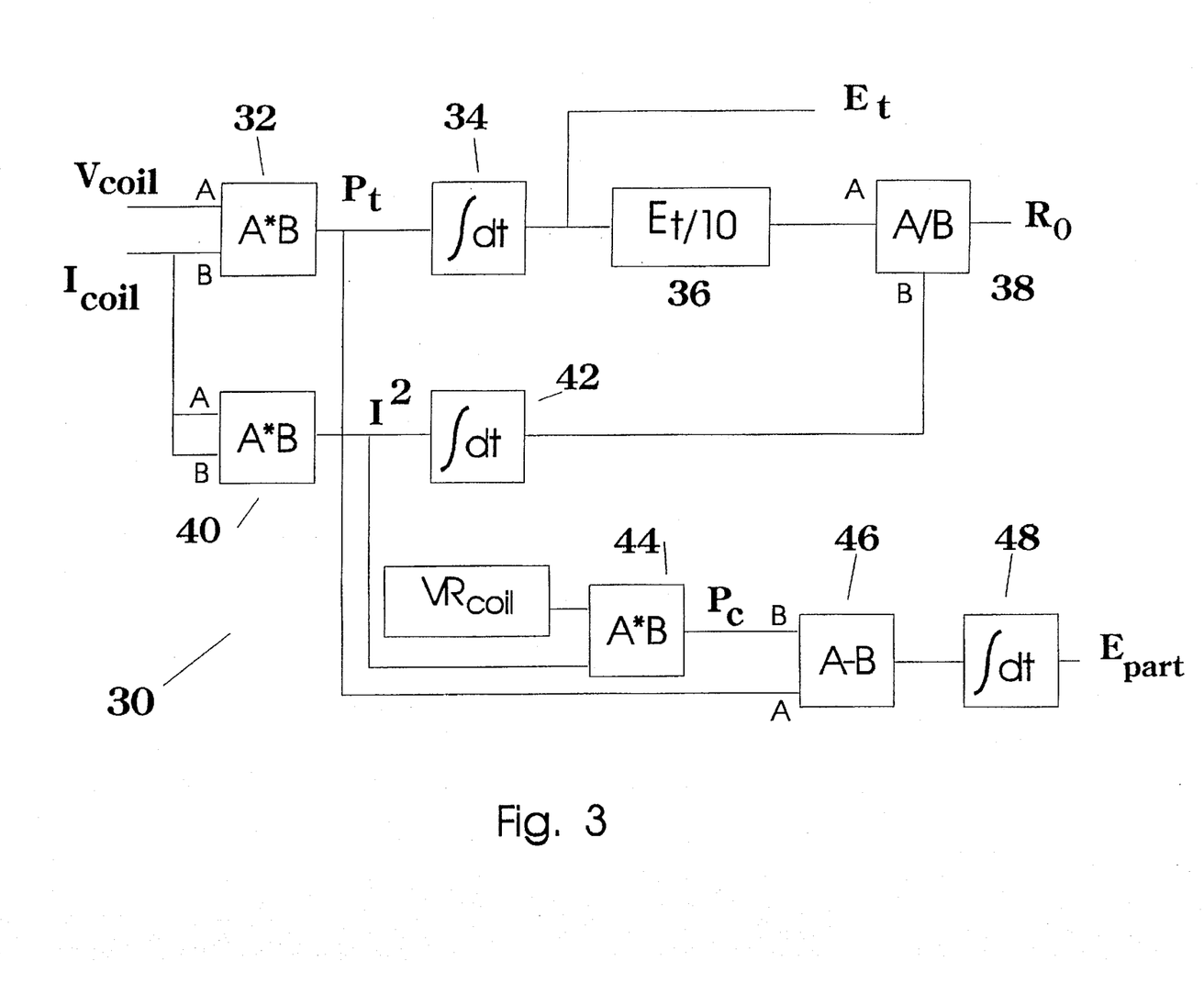
FIG. 3 shows a schematic diagram of a signal processor of the invention.

As shown in FIG. 3, signal processor 30 has inputs for the coil voltage V(t) across 66, 68 and for the coil current I(t) from integrator 55. The voltage and current are multiplied by multiplier 32 to provide total power P(t) (equation 1) and integrated by integrator 34 to provide total energy E(t) (equation 2), a value that may be utilized by the system to monitor the health of coil 60. This value is scaled by divider 36 and becomes the dividend for divider 38 for computation of $R_0$. The current is multiplied by itself by multiplier 40 and integrated by integrator 42 to become the divisor of divider 38. The output of divider 38 is $R_0$ (equation 6).

To determine the energy in the part, a voltage representative of the resistance of the coil (equation 3) is multiplied by multiplier 44 with the square of the current from multiplier 40 to produce a value representative of the power in coil 60. This value is subtracted in subtractor 46 from the total power output of multiplier 32 to provide power at part 60, which value is integrated by integrator 48 to provide energy at part 80 (equation 4).

Figure 4A:
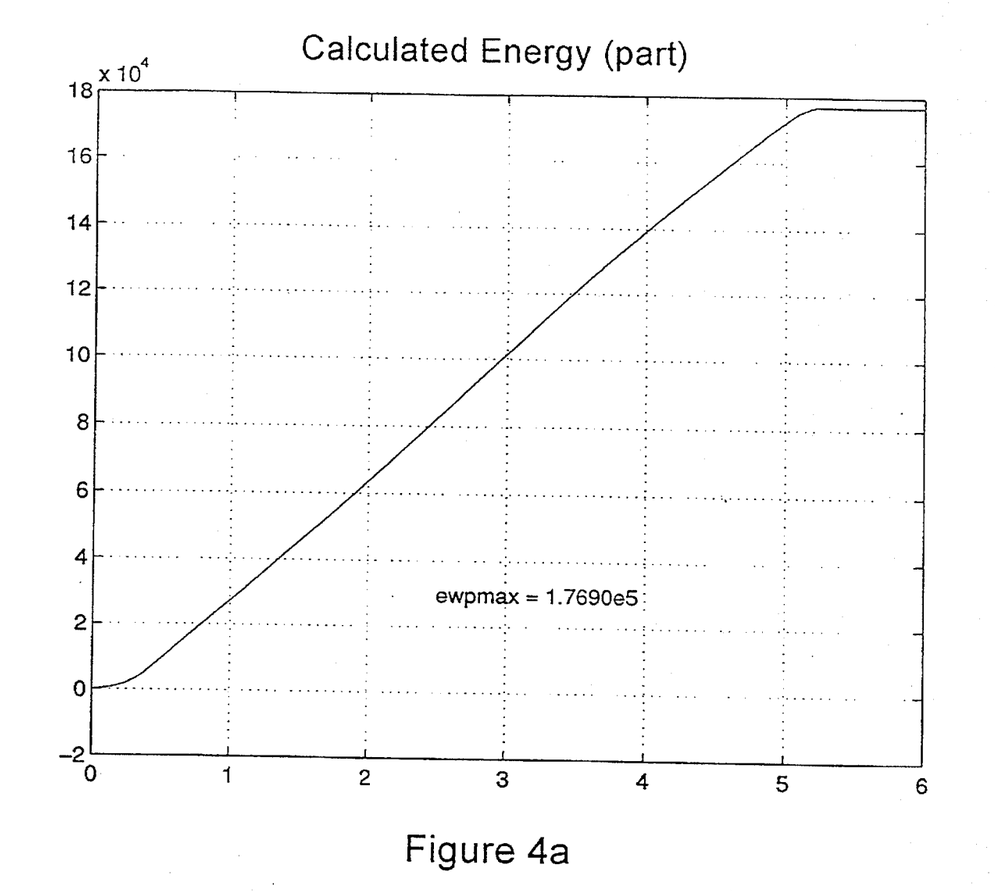
FIGS. 4a and 4b show sample calculated results from the signal processor of the invention.
Figure 4B:
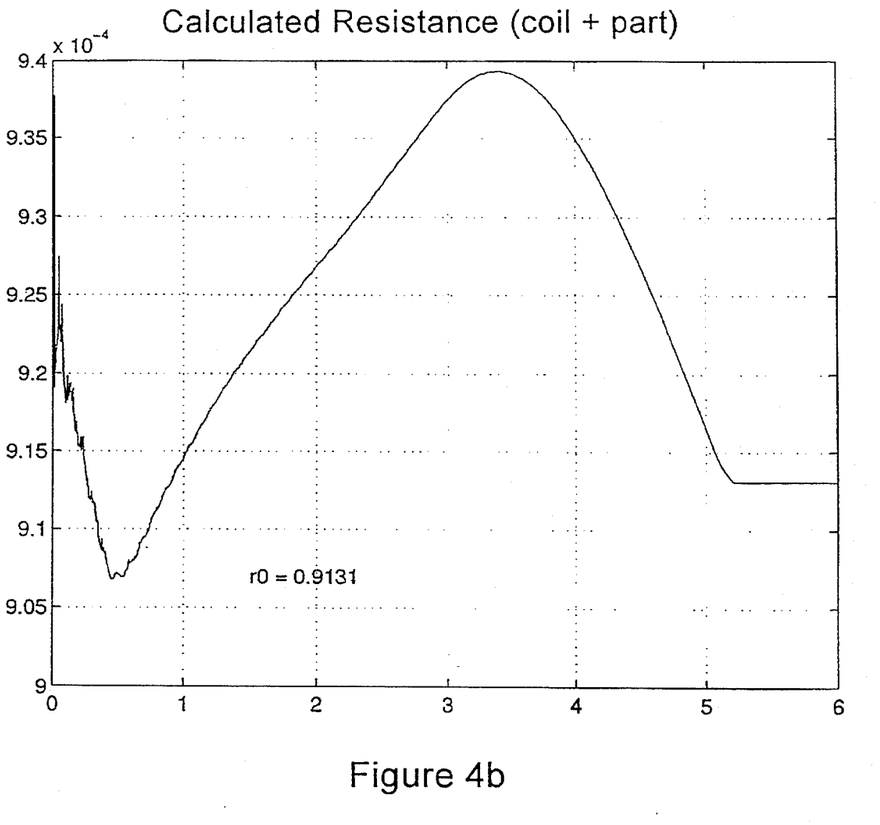

FIG. 4a shows the calculated value of $E_{part}$ and FIG. 4b shows the calculated value of $R_0$, obtained by processing the measured waveforms of FIGS. 2a and 2b in accordance with the teachings of equations (3) and (4). The shape of these particular waveforms has little meaning as they are determined by the internal circuitry of the machine which generated them. However, their changes reflect the effects of heating, as shown by this invention. For example, the slope of the signal indicative of the energy transferred to part 80 is monitored to show the power at which energy is transferred to part 80. In addition, the signature of $R_0$ shows features which indicate changing properties of the material.

The results of FIG. 4 were calculated in software. Similar calculations from the hardware processor 30 would yield slightly different results because the hardware processor has more noise associated with it than the software. However, this difference is automatically taken into account by the computer 25. As previously stated, hardware processor 30 is also much quicker than the present software adaptation.

The signals from processor 30 are processed through a trained neural network in computer 25 to produce estimates of the desired depth to effect the control signals for controlling the heating of a part. The control signal is derived from the error between the depth desired for the part and the depth estimated by the network. For this embodiment, the neural network had one internal layer with fewer than ten nodes. Implementation of this neural network was accomplished using standard neural network design tools.

The network in computer 25 was trained using standard backpropagation learning. Successive samples were hardened while calculating energies and $R_0$ from the measured voltage and current at coil 60. The depth of hardening of each sample was measured to determine the depth where the sample had a Rockwell hardness of 50. Selected electrical signal features, material characteristics, and the sample hardness value were then used to train the network using non-linear transfer functions with one or more hidden layers of nodes.

The hardness distribution in the sample was determined by performing a series of hardness tests with a standard Rockwell hardness tester in accordance with ASTM E119. The induction heating and quenching process hardens the sample from its outer diameter. By doing a series of tests on each sample in a spiral-like configuration from the sample surface at successive depth intervals of approximately 0.5 mm and spaced around the circumference of the test part, the depth from the cylinder edge where the hardness is 50 was accurately determined.

Table I shows results of the trained system of FIG. 1. The desired depth in millimeters for a part having hardness of 50 was the input to the system. Computer 25 controlled the amount of time heat was applied to the part based on its estimate of heating depth at any given time. The "NN Est" column shows the estimated hardness depth based on the characteristic signal features calculated from the time-integrated functions of measured voltage and current, and the material properties of the part, for that test. The "Actual" column shows the measured hardness depth.

TABLE 1

| Power | Desired Depth | NN Est | Actual Depth |
| --- | --- | --- | --- |
| 650 | 4.1 | 4.133 | 4.2338 |
| 650 | 4.3 | 4.38684 | 4.4068 |
| 650 | 4.5 | 4.58215 | 4.5256 |
| 650 | 4.7 | 4.80282 | 4.7745 |
| 700 | 4.1 | 4.22 | 4.4083 |
| 700 | 4.3 | 4.41452 | 4.5069 |
| 700 | 4.5 | 4.61842 | 4.5669 |
| 700 | 4.7 | 4.78621 | 4.7632 |
| 700 | 4.9 | 5.0042 | 4.8226 |
| 750 | 4.1 | 4.25 | 4.3446 |
| 750 | 4.1 | 4.22287 | 4.2902 |
| 750 | 4.3 | 4.40654 | 4.5743 |
| 750 | 4.5 | 4.68043 | 4.488 |
| 750 | 4.7 | 4.72322 | 4.5546 |
| 750 | 4.9 | 4.99685 | 4.8948 |

The data in Table 1 does not compensate for timing delays known to be present in the system. A desired embodiment of the invention will turn the power off slightly sooner than indicated by this data to compensate for this additional delay.

The significance of this invention is apparent from an examination of Table I. Hardening machine 20 is not a precision laboratory device; it is a commercial machine and it is used to harden commercially prepared steel. The parts have sample-to-sample variations; and the machine has test-to-test variations. The two tests at a power value of 750 and a desired depth of 4.1 would have identical results in a perfect world; they may not be identical in the real world. However, by utilizing the measured voltage and current as they are applied to each sample during each test, system 10 is able to control the time power is applied to each part 80 and provide an actual depth of hardening within 5% of desired depth over a range of settings.

The particular sizes and equipment discussed above are cited merely to illustrate a particular embodiment of this invention. It is contemplated that the use of the invention may involve parts having different sizes and shapes, and hardening machines having different waveforms, as long as the principle of using the measured current and voltage to control the heating process is followed. For example, parameters other than $E_{part}$ and $R_0$, such as $E_{total}$, may be used to train the network, or the measured voltage and current parameters could be utilized directly without calculating energy or power. Also, other mathematical combinations of calculated parameters, and material properties, may be used to train the network. In addition, the current at the primary of transformer 26, or at other locations in the machine, may provide a useful input for the neural network. Furthermore, the neural network may have additional hidden layers and nodes, or other techniques than neural networks, such as linear curve fits, may be utilized. The control of the heating process could involve other modifications to the control voltage than removal of the voltage, such as changing the voltage as a function of time. It is intended that the scope of the invention be defined by the claims appended hereto.

We claim:

1. A process of induction hardening a part to a desired depth with an AC signal applied to the part from a closely coupled induction coil comprising:

measuring parameters representative of the AC signal;

generating signals representative of the AC signal from the measured parameters;

processing the generated signals through a trained neural network to determine the depth of hardening of the part; and modifying the AC signal when the estimated depth of hardening reaches a predetermined value indicative of a desired depth of hardening.

2. The process of claim 1 wherein the measured parameters include the measured voltage V(t) of the AC signal at the coil and the current I(t) passing through the coil.

3. The process of claim 2 wherein the generated signals are a function of the time integral of the measured voltage and current.

4. The process of claim 2 wherein one generated energy signal represents the energy in the part and another generated resistance signal represents the total resistance of the induction coil and part when a part is being hardened; wherein changes in the energy signal reflects the effects of heating on the part, and changes in the resistance signal indicate changing properties of the material of the part.

5. The process of claim 4 wherein the generating step includes determining the value of the energy loss at the coil when the part is not present; determining the value of the energy of the coil and part when the part is being hardened; and subtracting the value of the coil energy loss from the value of the total energy to determine the value of the part energy.

6. The process of claim 5 wherein the measured parameters include the measured voltage of the AC signal at the coil and the current passing through the coil.

7. The process of claim 4 wherein the total resistance of the coil and part is $$R_0(t) = \int_0^t P(t)dt / \int_0^t I^2 dt,$$

where $P(t)=V(t)I(t)$.

8. A system for induction hardening a part to a desired depth comprising:

an AC power supply having an AC output;

induction coil means connected to said AC output for closely coupling AC to a part;

voltage measuring means for measuring the voltage of the AC output at the coil;

current measuring means for measuring the current passing through the coil; and control means, connected to said voltage and current measuring means, comprising means for generating signals representative of the energy at the part and the resistance of said induction coil from the measured voltage and current, wherein changes in the energy signal reflects the effects of heating on the part, and changes in the resistance signal indicate changing properties of the material of the part; and a trained neural network for processing the generated signals to estimate the depth of hardening of the part; and means responsive to an output from said neural network for controlling the AC output when the estimated depth of hardening reaches a predetermined value indicative of a desired depth of hardening.

9. The system of claim 8 wherein the signal representative of the energy at the part is generated by means for determining the value of the energy loss at the coil when the part is not present;

means for determining the value of the energy of the coil and part when the part is being hardened; and means for subtracting the value of the coil energy loss from the value of the total energy to determine the value of the part energy.

* * * * *